United States Patent Office 2,718,215
Patented Sept. 20, 1955

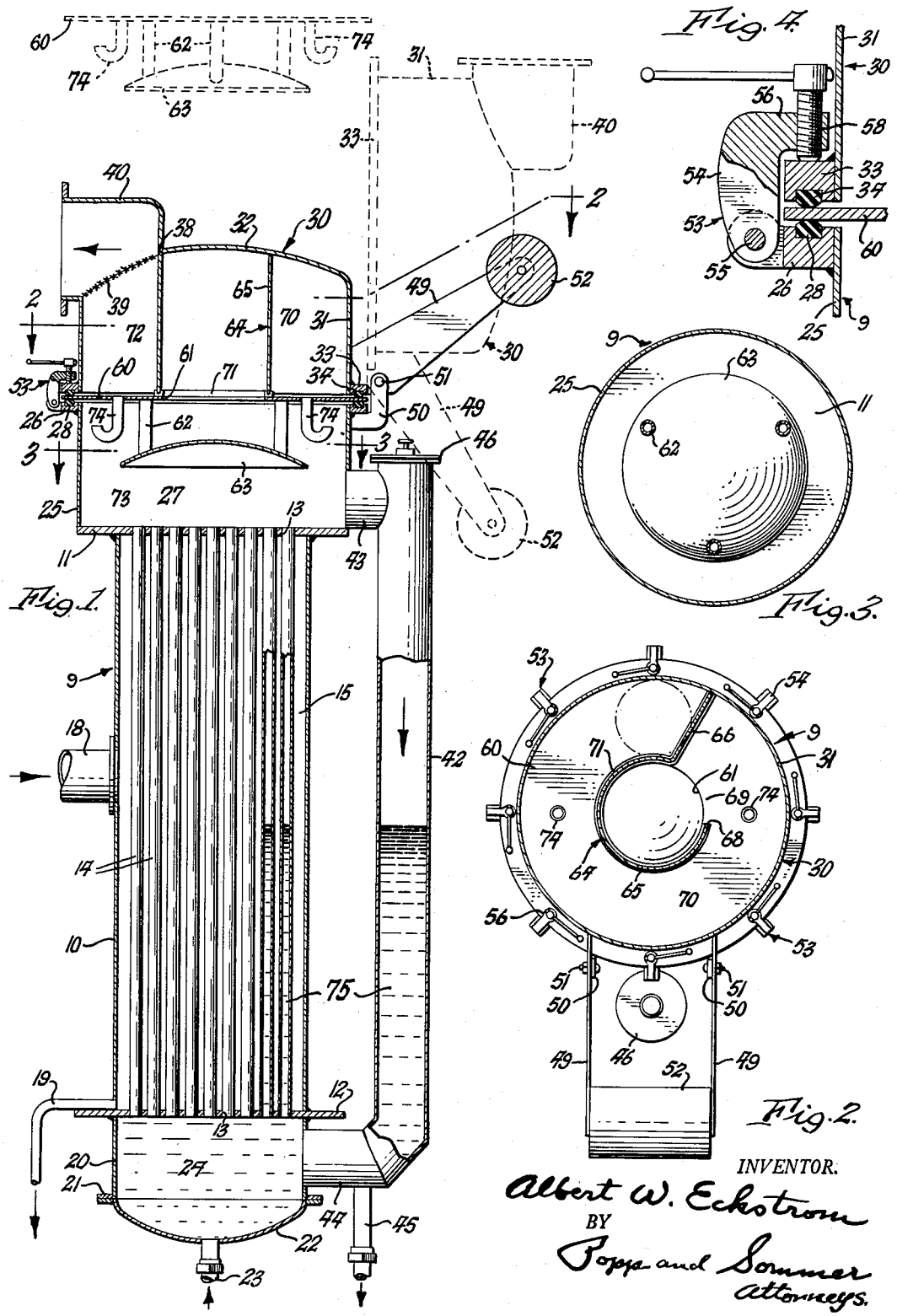

2,718,215

APPARATUS FOR SEPARATING LIQUID FROM VAPOR IN AN EVAPORATOR OR THE LIKE

Albert W. Eckstrom, Buffalo, N. Y., assignor to Blaw-Knox Company, Pittsburgh, Pa., a corporation of Delaware Application December 22, 1952, Serial No. 327,338

11 Claims. (Cl. 122—34)

This invention relates to apparatus for separating liquid from the vapor leaving an evaporator or the like, and more particularly to such separating apparatus which is mounted in the vapor space or dome constituting the upper part of the evaporator so as to avoid the necessity of providing a separate vapor-liquid separator alongside the evaporator.

One of the objects of the present invention is to provide such a vapor-liquid separator which can be mounted in the vapor space or dome at the top of an evaporator and at the same time have the capacity for separating the entrained liquid from the vapor passing through the vapor space and returning the separated liquid to the evaporator.

Another important object of the invention is to provide such a vapor-liquid separator which is readily accessible for cleaning the same.

Another object is to provide such a vapor-liquid separator which is of very simple and inexpensive construction and can be produced at low cost.

Other objects and advantages of the invention will be apparent from the following description and drawings in which:

Fig. 1 is a vertical longitudinal section through an evaporator equipped with a vapor-liquid separator embodying the present invention. In this view the open condition of the cover and the removed condition of part of the vapor-liquid separator is shown in dotted lines.

Figs. 2 and 3 are horizontal sections taken on the correspondingly numbered lines of Fig. 1.

Fig. 4 is an enlarged fragmentary view similar to Fig. 1 and showing the L-clamp in detail.

In the accompanying drawings a single evaporator is shown, although it will be understood that several of such evaporators can be connected so as to provide a multiple effect evaporator. In the evaporator shown the numeral 9 generally designates the vertical tubular shell of the evaporator having a cylindrical wall 10 which is shown as having its upper end welded to an upper tube sheet 11 and shown as having its lower end welded to a lower tube sheet 12, these tube sheets extending across the interior of the shell. These tube sheets are provided with a plurality of openings 13 which are in register with one another and in which the ends of vertical tubes 14 are inserted and secured, as by expanding the tubes in place. The space around these tubes 14 and bounded by the cylindrical wall 10 and tube sheets 11, 12, constitute a steam space or chest 15. Steam is admitted to the steam space or chest 15 through a steam inlet 18 and the condensate can be removed from a condensate outlet 19.

To the lower face of the lower tube sheet 12 is welded a vertical cylinder 20 the lower end of which is shown as being outwardly flanged as indicated at 21. To this flange is removably secured a dished bottom 22 having an inlet 23 for the liquid to be concentrated. The vertical cylinder 20, its bottom 22 and the lower tube sheet 12 define a chamber 24 containing the liquid being processed.

A vertical cylinder 25 is welded to the upper tube sheet 11 to extend upwardly therefrom and an outwardly projecting flange ring 26 is welded around the upper rim of this cylinder 25. This flange ring 26 is provided in its upper face with an annular channel receiving a circular sealing gasket 28 of soft resilient material and which projects upwardly from the upper face of the flange ring 26. This cylinder 25 forms, with the upper tube sheet 11, the upper vapor space 27 of the evaporator and this vapor space 27 is completed by a cover 30. This cover is shown as being in the form of a dome having a vertical cylindrical side wall 31 and an upwardly dished top wall 32. At its lower end a flange ring 33 is welded to project radially outwardly from the side wall 31. This flange ring has in its underside a groove receiving a sealing gasket 34 of soft resilient material which is arranged in mating relation with the sealing gasket 28 of the shell of the evaporator.

The vapors from the vapor space 27 escape through an opening 38 provided in the top wall 32 of the cover 30 near one side thereof. To the edge of this opening is welded, as indicated at 39, one end of a vapor outlet elbow 40, the discharge end of which is preferably directed horizontally as shown.

Liquid from the vapor space 27 is returned to the liquid chamber 24 at the bottom of the evaporator through a return leg 42. The upper end of this return leg is connected by a lateral branch 43 with the vapor space 27 immediately above the upper tube sheet 11 and the lower part of this return leg is connected by a laterally extending branch 44 with the liquid chamber 24 at the bottom of the evaporator. An outlet line 45 for the concentrated liquid can be provided at the bottom of the return leg 42 and this return leg can also have a clean out door 46 at its upper end.

For convenience, the cover 30 is preferably hinged to the shell 9 and is also preferably counterweighted. The hinge connection between the cover and the shell comprises a pair of vertically arranged generally parallel plates or arms 49 welded at their inner ends to the cylindrical wall 31 of the cover to project radially outwardly therefrom in the form of parallel outwardly and upwardly extending arms. A pair of bracket plates 50 are similarly welded to the cylindrical wall 25 of the shell 9 near the upper end thereof, these bracket plates being L-shaped and each being arranged in face-to-face relation with a corresponding arm 49 of the cover. A horizontal pivot bolt 51 connects each of the L-shaped bracket plates 50 with the corresponding plate or arm 49 of the cover, these bolts 51 being in axial alinement and serving as the hinge pins. The arms 49 of the cover are weighted at their outer ends. For this purpose a counterweight 52 can be secured between the ends of these arms in any suitable manner.

The cover 30 is preferably clamped against the rim or flange ring 26 at the upper end of the cylinder 25 by an annular series of swinging clamping screws or L-clamps, indicated generally at 53. Each of these L-clamps is shown as comprising an L-shaped body 54 pivoted to the flanged ring 26 at 55 so that one leg 56 of this L-shaped body swings over the flange ring 33 of the dome or cover 30. This leg 56 is provided with a threaded bore receiving a manual clamping screw 58, this screw being vertically disposed when the leg 56 is positioned over the flange ring 33. It will therefore be seen that by swinging the several bodies 54 upwardly and inwardly over the cover flange ring 33 and screwing down the screw 58, this top flange ring 33 of the dome or cover is clamped against the flange ring 17 of the cylinder 25.

The present invention is essentially concerned with the separation, in the vapor space 27, of entrained liquid from the vapors passing through this space and with such a structure which is readily accessible and in part removable for cleaning. For this purpose this vapor-liquid separator includes a circular plate 60 the perimeter or rim of which is disposed between the two sealing gaskets 28 and 34 of the cylinder 25 and cover 30, respectively. This plate is provided with a relatively large central opening 61, this opening being out of vertical register with the opening 38 of the cover 30. Around this opening an annular series of depending hanger rods 62 is fixed to the underside of the plate 60. The upper ends of these rods are preferably secured by welding to the under face of the circular plate. At their lower ends these rods carry an upwardly dished or dome-shaped baffle 63 to which the hanger rods 62 can be secured by welding. This baffle 63 is preferably in the form of a section of a sphere although its precise shape is not important. However, it is important that this dome-shaped baffle 63 be in line with all of the tubes 14, these tubes projecting liquid and vapor at high velocity against the underside of this dome-shaped baffle 63 which serves to deflect the liquid laterally.

Above the annular plate 60 a depending baffle or wall 64 is welded to the underside of the cover 30 along its upper edge so as to depend therefrom. In horizontal section this wall or baffle 64 is sinuous being preferably in the form of a crook or question mark having an open sided cylindrical inner portion 65 which is in register with the opening 61 in the circular plate 60. One end 66 of this baffle or wall continues from one end of the open sided cylindrical central part 65 radially to contact the cylindrical side wall 31 of the cover to which it is preferably welded. The opposite end 68 of this central cylindrical portion 65 preferably terminates short of the juncture between the cylindrical and radial portions 65, 66 of the wall so as to provide an opening 69 providing communication between the interior of the cylindrical portion 65 and the space surrounding this cylindrical part. The radial portion 66 of the wall or baffle is arranged between the vapor outlet opening 38 and the opening 69 and it will therefore be seen that the question mark-shaped wall 64 provides a sinuous or volute-shaped passage channel 70 to the inner end of which passage is in communication with the opening 61 of the circular plate 60 and the outer end of which is in communication with the opening 38 leading to the vapor discharge elbow 40. In order to confine the vapors to passage through the full length of this volute-shaped channel 70, the lower edge of the question mark-shaped wall or baffle 64 is preferably provided with a sealing gasket 71 of soft resilient material which, as shown, contacts the upper face of the circular plate 60.

It will be seen that the plate 60 divides the vapor space 27 into an upper chamber 72 and a lower chamber 73. For the purpose of draining the liquid collecting on the plate 60, U-tubes 74 are provided. These are fixed to depend from the plate 60 and communicate at their upper ends with the upper chamber 72 to drain liquid collecting on the plate 60 into the lower chamber 73.

In the operation of the evaporator as above described, the liquid to be concentrated is admitted to the liquid chamber 24 from a supply line 23 so as to maintain a liquid body 75 in this liquid chamber 24, the tubes 14 and the return leg 42 at approximately the level indicated. This body is continuously being concentrated, and the concentrated liquid flows out through the outlet line 45.

The concentration is effected by the admission of steam from the steam supply line 18 to the steam chest 15. This steam heats the tubes 14 at such temperature as to cause the rapid evolution of vapor within these tubes and which vapor, together with a large quantity of the liquid to be condensed, is projected upwardly from the upper ends of the tubes 14. This liquid strikes the dome-shaped baffle 63 which spreads the liquid laterally and discharges it against the cylindrical side wall 25 of the vapor chamber 35. This liquid flows back along the upper tube sheet 11 into the upper inlet 43 of the return leg to rejoin the body 75 of liquid being processed.

The vapor, together with a substantial amount of entrained liquid, flows upwardly around the edge of the dome-shaped baffle 63 and thence inwardly past the hanger rods 62 toward the central opening 61 in the circular plate 60. With this reversal in flow of the vapors a substantial amount of the entrained liquid is deposited on the surrounding walls and flows back to rejoin the liquid flowing back through the return leg 42 to the body 75 of liquid being processed.

The vapor then enters the cylindrical part 65 of the question mark-shaped baffle 64, this being the beginning of the sinuous or volute-shaped path 70 leading to the vapor outlet elbow 40. In so flowing upwardly from the opening 61, a large part of the entrained liquid is thrown against the underside of the cover 30 due to change in direction of the stream of vapor in traversing the horizontal passage 70. The vapor then pases along this path flowing through the opening 69 into the space between the cylindrical portion 65 of the question mark-shaped baffle 64 and the cover 30, the bottom of this space being enclosed by the circular plate 60 and sealing strip 71. The flow through this plate is clockwise as viewed in Fig. 2 and in flowing through this volute-shaped channel 70, substantially all of the liquid entrained in the vapor is discharged principally by centrifugal force against the surrounding walls along which the liquid flows downwardly to the circular plate 60. From this plate the liquid drains through the U-tubes 74 into the lower vapor chamber 73.

In addition to its mechanical simplicity and its effectiveness, the principal feature of the present invention resides in its ready accessibility, and cleanability. Especially where evaporators are used for food products it is important that they be readily kept in a clean and sanitary condition.

It will be noted that by loosening the clamping screws 58 the L-shaped clamping members 56 can be swung outwardly so as to free the dome-shaped cover 30. Particularly with the assistance of the counterweight 52, the dome-shaped cover can then be swung about the hinge pins 51 from the horizontal operative position shown by the full lines in Fig. 1 to the dotted line upright position shown in Fig. 1. In this position it will be seen that the entire interior of the dome-shaped cover can easily be cleaned, particularly both sides of the sinuous or volute-shaped channel 70. Thus the question mark-shaped vertical wall 64 can be cleaned as easily as any other part of the cover since one entire side of the channel 70 is entirely open.

The circular plate 60, together with its depending dome-shaped baffle 63 and U-tubes can then be lifted from the shell 9 of the evaporator as also indicated by the dotted lines above Fig. 1. So separated, the plate 60 and dome-shaped baffle 63 can obviously be readily cleaned, particularly so far as its U-shaped tubes 74 are concerned. Also with this structure so removed from the shell, the lower vapor chamber 73 of the tubular shell 9 of the evaporator can also be readily cleaned, as well as the tubes 14.

From the foregoing it will therefore be seen that the present invention provides a very simple and inexpensive form of vapor-liquid separator which is of such size as to fit within the vapor space at the top of an evaporator and avoid the necessity for a separate separator; which is highly effective in its separation action; and which in particular is readily accessible and cleanable when such is required.

I claim:

1. In an evaporator or the like having a vertical tubular shell open at its upper end, a dome-shaped open bottomed removable cover enclosing the open upper end of said tubular shell, a generally horizontal tube sheet across the interior of said tubular shell below the open upper end thereof and forming with the upper end of said tubular shell and said removable cover a vapor space, a plurality of vertical tubes connected with and extending downwardly from said tube sheet and severally communicating with openings in said tube sheet, means arranged to supply the liquid to be evaporated to the interior of said tubes, means arranged to heat said tubes to effect vaporization of the liquid therein and discharge of vapor and liquid upwardly into said vapor space and means for draining liquid from said vapor space; the combination therewith of means for exhausting vapor from said vapor space and removing entrained liquid from the vapor so being exhausted, comprising means providing an outlet opening through said cover, a generally horizontal plate removably supported at the upper end of said tubular shell and extending across said vapor space to divide said vapor space into upper and lower chambers, said plate having an opening arranged out of vertical register with said opening in said cover, and a sinuous vertical wall fast to the interior of said cover and removably contacting said plate along the lower edge of said wall, said wall providing a horizontally sinuous passage arranged to conduct vapors from said opening in said plate to said opening in said cover through a circuitous path.

2. A structure as set forth in claim 1 wherein said opening in said cover is at one side of said cover, wherein said opening in said plate is at the center thereof, and wherein said sinuous vertical wall is shaped to extend from one side wall of said cover at one side of said opening in said cover and to partially encircle said opening in said plate thereby to provide a horizontal volute-shaped passage leading from said opening in said plate to said opening in said cover.

3. A structure as set forth in claim 2 wherein said vertical wall is of question mark shape in horizontal section with its open loop surrounding said opening in said plate and with its other part extending radially of said cover into contact with the side wall thereof at one side of the opening in said cover.

4. A structure as set forth in claim 1 wherein an elongated piece of resilient sealing material extends along and is interposed between said lower edge of said vertical wall and the upper face of said plate.

5. A structure as set forth in claim 1 wherein U-tubes depend from said plate and communicate at their upper ends with said upper chamber to drain liquid from the upper surface of said plate into said lower chamber.

6. A structure as set forth in claim 1 wherein said plate has depending hanger rods fixed thereto, and wherein a horizontal baffle is fixed to the lower ends of said hanger rods in line with said tubes to deflect laterally the liquid discharged upwardly from said tubes.

7. In an evaporator or the like having a vertical tubular shell open at its upper end and provided with a rim at its upper end having an upwardly facing face, a sealing gasket extending around said rim and projecting upwardly from said face, a dome-shaped open bottomed removable cover enclosing the upper end of said tubular shell and having a rim with a downwardly facing face mating with said upwardly facing face of said tubular shell, a sealing gasket extending around said rim of said cover and projecting downwardly from its said face, a generally horizontal tube sheet across the interior of said tubular shell below the open upper end thereof and forming with the upper end of said tubular shell and said removable cover a vapor space, a plurality of vertical tubes connected with and extending downwardly from said tube sheet and severally communicating with openings in said tube sheet, means arranged to supply the liquid to be evaporated to the interior of said tubes, means arranged to heat said tubes to effect vaporization of the liquid therein and discharge of vapor and liquid upwardly into said vapor space; the combination therewith of means for exhausting vapor from said vapor space and removing entrained liquid from the vapor so being exhausted, comprising means providing an outlet opening through said cover, a generally horizontal removable plate extending across said vapor space to divide said vapor space into upper and lower chambers and having its perimeter interposed between said sealing gaskets, said plate having an opening arranged out of vertical register with said opening in said cover and a sinuous vertical wall fastened to the interior of said cover and removably contacting said plate along the lower edge of said wall, said wall providing a horizontally sinuous passage arranged to conduct vapors from said opening in said plate to said opening in said cover through a circuitous path.

8. A structure as set forth in claim 7 wherein said opening in said cover is at one side of said cover, wherein said opening in said plate is at the center thereof, and wherein said sinuous vertical wall is shaped to extend from one side wall of said cover at one side of said opening in said cover and to partially encircle said opening in said plate thereby to provide a horizontal volute-shaped passage leading from said opening in said plate to said opening in said cover.

9. A structure as set forth in claim 7 wherein an elongated piece of resilient sealing material extends along and is interposed between said lower edge of said vertical wall and the upper face of said plate.

10. A structure as set forth in claim 8 wherein U-tubes depend from said plate and communicate at their upper ends with said upper chamber to drain liquid from the upper surface of said plate into said lower chamber.

11. A structure as set forth in claim 8 wherein said plate has depending hanger rods fixed thereto, and wherein a horizontal baffle is fixed to the lower ends of said hanger rods in line with said tubes to deflect laterally the liquid discharged upwardly from said tubes.

References Cited in the file of this patent

UNITED STATES PATENTS

| Number | Name | Date |
| --- | --- | --- |
| 1,028,737 | Kestner | June 4, 1912 |
| 1,028,738 | Kestner | June 4, 1912 |
| 1,299,955 | Jones | Apr. 8, 1919 |